(12) United States Patent
Fuse

(10) Patent No.: US 8,484,951 B2
(45) Date of Patent: Jul. 16, 2013

(54) INTERNAL COMBUSTION ENGINE

(75) Inventor: Hidetaka Fuse, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 111 days.

(21) Appl. No.: 13/260,845

(22) PCT Filed: Feb. 7, 2011

(86) PCT No.: PCT/JP2011/000674
§ 371 (c)(1),
(2), (4) Date: Sep. 28, 2011

(87) PCT Pub. No.: WO2012/107949
PCT Pub. Date: Aug. 16, 2012

(65) Prior Publication Data
US 2012/0227386 A1     Sep. 13, 2012

(51) Int. Cl.
*F01N 3/00*     (2006.01)

(52) U.S. Cl.
USPC ............ 60/286; 60/295; 60/289; 60/274; 60/299; 431/12; 431/39; 431/75

(58) Field of Classification Search
USPC ............................................. 60/274–324
See application file for complete search history.

(56) References Cited

U.S. PATENT DOCUMENTS 8,353,151 B2 * 1/2013 Tsujimoto et al. ............ 60/286
2010/0186386 A1 * 7/2010 Tsujimoto et al. ............ 60/286

FOREIGN PATENT DOCUMENTS

| JP | 55134209 A | * | 10/1980 |
| JP | 2005-127257 A | | 5/2005 |
| JP | 2010-059886 A | | 3/2010 |
| WO | 2010/026466 A1 | | 3/2010 |

* cited by examiner

*Primary Examiner* — Thomas Denion
*Assistant Examiner* — Jesse Bogue
(74) *Attorney, Agent, or Firm* — Sughrue Mion, PLLC

(57) ABSTRACT

An internal combustion engine includes an exhaust treatment apparatus provided in an exhaust passage and a burner apparatus provided upstream of the exhaust treatment apparatus. The burner apparatus includes a fuel addition valve which adds fuel into the exhaust passage, heating means for heating the fuel added by the fuel addition valve, and a small-sized oxidation catalyst provided in the exhaust passage downstream of the heating means. The amount of fuel added by the fuel addition valve per predetermined unit time is controlled to control the position of an ignition point where the added fuel is ignited. Thus, the small-sized oxidation catalyst and the exhaust treatment apparatus can be efficiently warmed up.

11 Claims, 5 Drawing Sheets

INTERNAL COMBUSTION ENGINE

CROSS REFERENCE TO RELATED APPLICATION

This application is a National Stage of International Application No. PCT/JP2011/000674 filed Feb. 7, 2011, the contents of all of which are incorporated herein by reference in their entirety.

TECHNICAL FIELD

The present invention relates to an internal combustion engine, and in particular, to an internal combustion engine including a burner apparatus provided upstream of an exhaust treatment apparatus in an exhaust passage to increase an exhaust temperature.

BACKGROUND ART

In some internal combustion engines, a burner apparatus is provided upstream of an exhaust treatment apparatus (a catalyst and the like) in an exhaust passage. In this case, heating gas generated by the burner apparatus is utilized to increase an exhaust temperature. The exhaust treatment apparatus is thus heated to promote warm-up thereof. The burner apparatus typically ignites and combusts fuel added into the exhaust passage to generate heating gas containing flame. A small-sized oxidation catalyst may be provided in the exhaust passage to reform or combust the added fuel.

For example, an apparatus described in Patent Document 1 intermittently supplies fuel directly to a small-sized oxidation catalyst in the exhaust passage to intermittently generate flame downstream of the small-sized oxidation catalyst.

Preferably, during warm-up after starting of an internal combustion engine, the small-sized oxidation catalyst, located on an upstream side, is activated earlier than the exhaust treatment apparatus, located on a downstream side. Thus, preferably, heating gas is more positively supplied to the small-sized oxidation catalyst than to the exhaust treatment apparatus. On the other hand, preferably, after the small-sized oxidation catalyst is activated, heating gas is more positively supplied to the exhaust treatment apparatus than to the small-sized oxidation catalyst to promote warm-up of the exhaust treatment apparatus.

However, in general, the position of an ignition point for the added fuel is not subjected to any control. Thus, even if heating gas is desirably positively supplied to the small-sized oxidation catalyst, the hating gas may be actually positively supplied to the exhaust treatment apparatus or vice versa. Hence, efficient warm-up of the small-sized oxidation catalyst and the exhaust treatment apparatus is difficult.

An object of the present invention is to provide an internal combustion engine that allows the small-sized oxidation catalyst and the exhaust treatment apparatus to be efficiently warmed up.
Citation List
Patent Literature
PTL 1: Japanese Patent Laid-Open No. 2010-59886

SUMMARY OF INVENTION

An aspect of the present invention provides an internal combustion engine characterized by comprising:
an exhaust treatment apparatus provided in an exhaust passage;
a burner apparatus provided upstream of the exhaust treatment apparatus to increase an exhaust temperature; and
control means for controlling the burner apparatus, and
in that the burner apparatus includes a fuel addition valve which adds fuel into the exhaust passage, heating means for heating the fuel added by the fuel addition valve, and a small-sized oxidation catalyst provided in the exhaust passage downstream of the heating means, and
the control means controls an amount of fuel added by the fuel addition valve per predetermined unit time to control a position of an ignition point where the added fuel is ignited.

Preferably, the internal combustion engine further comprises determination means for determining an activity state of the small-sized oxidation catalyst.

Preferably, when the determination means determines the small-sized oxidation catalyst to be inactive, the control means sets the amount of fuel added per unit time smaller than the amount of fuel added per unit time when the small-sized oxidation catalyst is active, thus controllably placing the position of the ignition point closer to the heating means.

Preferably, when the determination means determines the small-sized oxidation catalyst to be active, the control means sets the amount of fuel added per unit time greater than the amount of fuel added per unit time when the small-sized oxidation catalyst is inactive, thus controllably placing the position of the ignition point further from the heating means.

Preferably, the determination means also determines the activity state of the exhaust treatment apparatus, and
when the determination means determines the small-sized oxidation catalyst and the exhaust treatment apparatus to be inactive, the control means sets the amount of fuel added per unit time smaller than the amount of fuel added per unit time when the small-sized oxidation catalyst is active, thus controllably placing the position of the ignition point closer to the heating means.

Preferably, when the determination means determines the small-sized oxidation catalyst to be active and the exhaust treatment apparatus to be inactive, the control means sets the amount of fuel added per unit time greater than the amount of fuel added per unit time when the small-sized oxidation catalyst is inactive, thus controllably placing the position of the ignition point further from the heating means.

Preferably, the control means increases the amount of fuel added per unit time consistently with a flow rate of exhaust gas.

Preferably, the control means increases the amount of fuel added per unit time inconsistently with an oxygen concentration of exhaust gas.

Preferably, the control means controllably places the position of the ignition point forward of a front end surface of the small-sized oxidation catalyst.

Preferably, in order to combust and remove soot deposited on and near the fuel addition valve, the control means periodically allows the fuel addition valve to add fuel in such a manner that the amount of fuel added per unit time has a relatively small predetermined value and actuates the hearing means.

Preferably, the control means intermittently drives the fuel addition valve open to allow the fuel addition valve to intermittently add fuel and controls at least one of an amount of fuel added per addition and an addition interval to control the amount of fuel added per unit time.

The present invention is very effective for efficiently warming up the small-sized oxidation catalyst and the exhaust treatment apparatus.

DESCRIPTION OF EMBODIMENTS

A preferred embodiment of the present invention will be described below in detail. However, it should be noted that the embodiment of the present invention is not limited to aspects described below but includes all variations and applications embraced by the concepts of the present invention specified by the claims. The sizes, materials, shapes, and relative arrangements of components described in the embodiment are not intended to limit the technical scope of the preset invention thereto unless otherwise specified.

An upstream side is hereinafter also referred to as a "forward" side. A downstream side is hereinafter also referred to as a "rearward" side.

Figure 1:
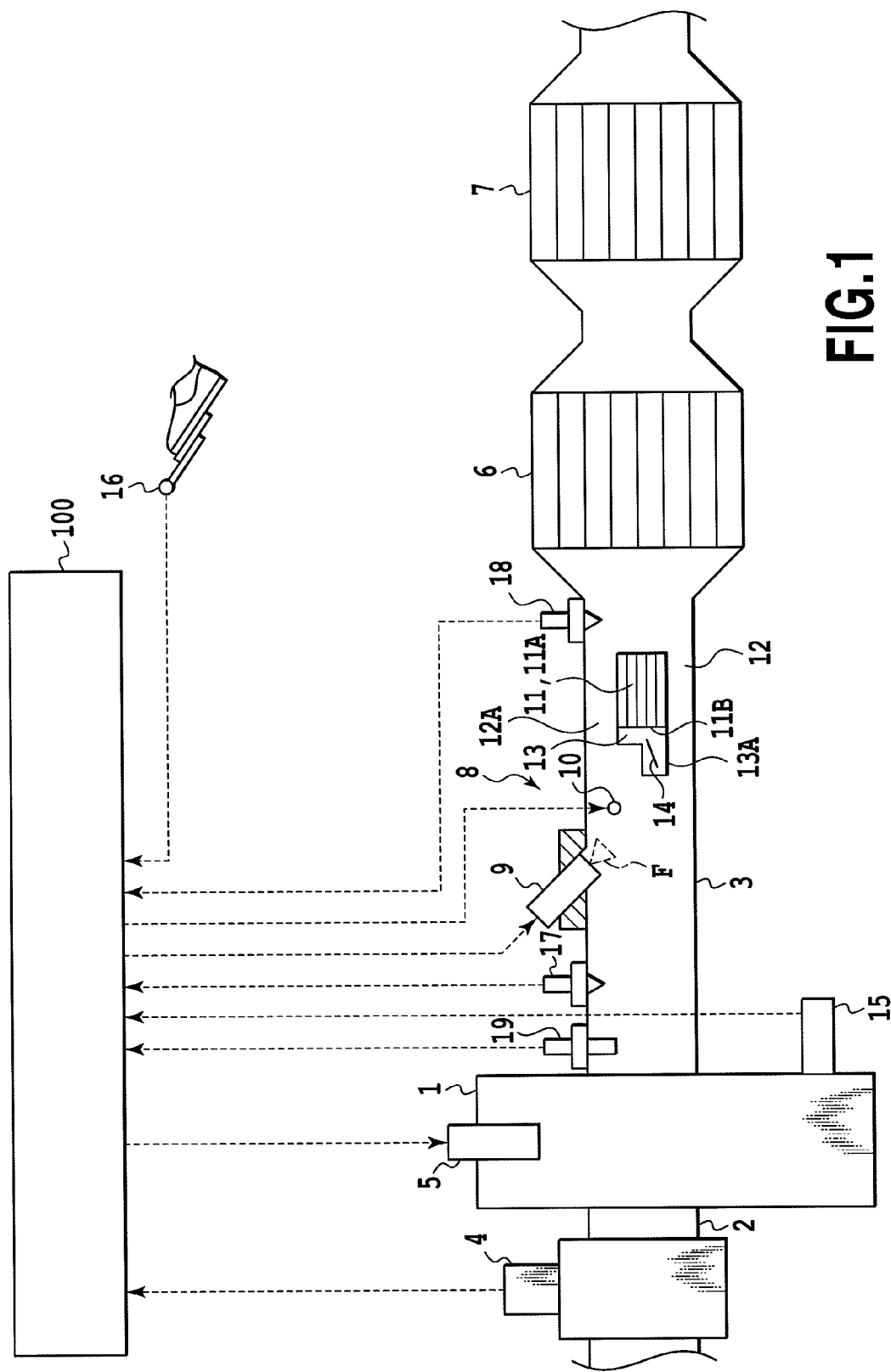
FIG. 1 is a schematic diagram of an internal combustion engine according an embodiment of the present invention.

FIG. 1 schematically shows a configuration of an internal combustion engine (engine) according to the present embodiment. The engine is a vehicle mounted four-stroke diesel engine. An intake pipe 2 forming an intake passage and an exhaust pipe 3 forming an exhaust passage are connected to an engine main body 1. An airflow meter 4 is provided in the middle of the intake pipe 2 to output a signal corresponding to the flow rate of intake air flowing through the intake pipe 2. The airflow meter 4 detects the amount of intake air flowing into the engine main body 1 per unit time (that is, the flow rate of the intake air). The engine main body 1 includes a plurality of cylinders. Each of the cylinders includes a fuel injection valve configured to inject fuel directly into the cylinder, that is, an intra-cylinder injection valve 5. FIG. 1 shows only the single intra-cylinder injection valve 5.

An outlet portion of the exhaust pipe 3 (not shown in the drawings) is open to the air via a muffler. Furthermore, as shown in FIG. 1, an oxidation catalyst 6 and an NOx catalyst 7 are arranged in the middle of the exhaust pipe 3 in series in this order from the upstream side.

The oxidation catalyst 6 allows an unburned component such as HC or CO to react with $O_2$ to obtain CO, $CO_2$. $H_2O$, or the like. Examples of catalytic material may include $Pt/CeO_2$, $Mn/CeO_2$, $Fe/CeO_2$, $Ni/CeO_2$, and $Cu/CeO_2$.

The NOx catalyst 7 is preferably formed of an NOx storage reduction (NSR) catalyst. The NOx catalyst 7 functions to absorb NOx from inflow exhaust for storage when the exhaust has a high oxygen concentration and to reduce the stored NOx when the oxygen concentration of the inflow exhaust decreases and a reduction component (for example, fuel) is present. The NOx catalyst 7 includes a base material formed of an oxide such as alumina $Al_2O_3$ and a rare metal such as platinum Pt and an NOx absorption component both borne on the surface of the base material; the rare metal serves as a catalytic component. The NOx absorption component is formed of at least one component selected from a group including alkali metals such as potassium K, sodium Na, lithium Li, and cesium Cs, alkali earths such as barium Ba and calcium Ca, and rare earths such as lanthanum La and yttrium Y. The NOx catalyst 7 may also be a selective catalytic reduction (SCR) converter.

In addition to the oxidation catalyst 6 and the NOx catalyst 7, a particulate filter (DPF) that collects particulates (PM) such as soot in the exhaust. Preferably, the DPF is of a continuous recycling type that bears a catalyst formed of a rare metal to continuously oxidize and combust the collected particulates. Preferably, the DPF is arranged at least downstream of the oxidation catalyst 6 and upstream or downstream of the NOx catalyst 7. The engine may be a spark ignition internal combustion engine. In this case, a three-way catalyst is preferably provided in the exhaust passage. The oxidation catalyst 6, the NOx catalyst 7, the DPF, and the three-way catalyst correspond to an exhaust treatment apparatus according to the present invention.

A burner apparatus 8 is arranged in the exhaust pipe 3 upstream of the oxidation catalyst 6 to increase the exhaust temperature. The burner apparatus 8 includes a fuel addition valve 9, a heater or a glow plug 10 serving as a heating apparatus or heating means, and a small-sized oxidation catalyst 11. The burner apparatus 8 is arranged downstream of an aggregation portion of exhaust manifolds (not shown in the drawings) formed at an upstream end of the exhaust pipe 3.

The fuel addition valve 9 injects, feeds, or adds liquid fuel F into the exhaust pie 3. Light oil, which is fuel for the engine, is also directly used as the fuel F. However, another type of fuel may be used. The fuel addition valve 9 injects the fuel F from a predetermined circumferential position in an outer peripheral portion of the exhaust pipe 3 toward a central portion of the exhaust pipe 3 and obliquely toward the downstream side. In the illustrated example, the fuel addition valve 9 injects the fuel F from the upper portion toward central portion of the exhaust pipe 3 and obliquely downward toward the downstream side.

The glow plug 10 is configured to heat the fuel F added by the fuel addition valve 9, more specifically, an air-fuel mixture gas containing the fuel F. The glow plug 10 is arranged downstream of the fuel addition valve 9 and installed by being inserted from a side portion of the exhaust pipe 3 so that the axis line of the glow plug 10 is perpendicular to the axis line of the fuel addition valve 9. A heat generation portion at a tip of the glow plug 10 is arranged almost opposite the injected fuel F. That is, the fuel addition valve 9 injects the fuel toward the heat generation portion of the glow plug 10. The glow plug 10 is connected to a vehicle mounted battery via a boosting circuit (not shown in the drawings) so that the heat generation portion generates heat when the glow plug 10 is energized. The glow plug 10 can be arranged in any posture.

Preferably, the glow plug 10 is installed at a sufficient distance from the fuel addition valve 9 to prevent the fuel F in the form of droplets injected by the fuel addition valve 9 from reaching the glow plug 10. However, the glow plug 10 may be installed relatively close to the fuel addition valve 9 so that the fuel F can reach the glow plug 10.

The small-sized oxidation catalyst 11 is installed in the exhaust pipe 3 downstream of the glow plug 10. The small-sized oxidation catalyst 11 has an outer diameter smaller than the inner diameter of the exhaust pipe 3. The axial direction of the small-sized oxidation catalyst 11 is parallel to that of the exhaust pipe 3. The small-sized oxidation catalyst 11 is arranged almost coaxially with the exhaust pipe 3. The small-sized oxidation catalyst 11 is sized such that the cross-sectional area of the small-sized oxidation catalyst 11 occupies a part of cross-sectional area of the exhaust pipe 3. The small-sized oxidation catalyst 11 is installed in the exhaust pipe 3 so as to hang therein by means of a plurality of stays (not shown in the drawings).

The small-sized oxidation catalyst 11 is of what is called a straight flow type in which individual cells communicate with one another from the upstream side to the downstream side. The small-sized oxidation catalyst 11 may have the same configuration as or a configuration different from that of the downstream oxidation catalyst 6. For example, the small-sized oxidation catalyst 11 may include a bearer formed of zeolite and bearing rhodium or the like. A gas passage inside the small-sized oxidation catalyst 11 is referred to as an intra-catalyst passage 11A.

On the other hand, an outer peripheral passage 12 is defined radially outside the small-sized oxidation catalyst 11, that is, between the small-sized oxidation catalyst 11 and the exhaust pipe 6 to allow exhaust gas to flow through the outer peripheral passage 12. In particular, an addition valve-side outer peripheral passage corresponding to a part of the outer peripheral passage 12, that is, an upper outer peripheral passage 12A, is defined at a predetermined circumferential position where the fuel addition valve 9 is installed, that is, in the illustrated example, an upper position.

A guide pipe 13 is provided at a front surface 11B of the small-sized oxidation catalyst 11 so as to extend the entire periphery of the outer peripheral end of the small-sized oxidation catalyst 11. The upper half of the guide pipe 13 is cut over a predetermined rearward length from the front end of the guide pipe 13 to form a guide plate 13A shaped like a gutter or a semi circular pipe. A front end of the guide pipe 13 is also positioned downstream of the glow plug 10. The guide pipe is configured to guide an air-fuel mixture and flame generated by fuel addition into the small-sized oxidation catalyst 11. This will be described below in detail.

An impact plate 14 is installed in the guide plate 13 so as to traverse the guide plate 13A. The impact plate 13A is formed of a flat plate and is inclined such that one surface thereof, that is, an upper surface, generally faces the fuel addition valve 9 and the glow plug 10. The impact plate 14 allows an air-fuel mixture and flame generated by fuel injection to impinge thereon so as to be easily introduced into the small-sized oxidation catalyst 11. This will be described below in detail.

The engine includes an electronic control unit (hereinafter referred to as an ECU) 100 serving as control means for integrally controlling the engine. The ECU 100 includes a CPU configured to carry out various arithmetic processes for engine control, a ROM configured to store programs and data required for the control, a RAM configured to temporarily store the results of arithmetic processes carried out by the CPU, and an I/O port configured to receive and output signals from and to external apparatuses.

The ECU 100 connects not only to the above-described airflow meter 4 but also a crank angle sensor 15 configured to detect the crank angle of the engine and an accelerator opening-degree sensor 16 configured to detect the opening degree of the accelerator. The ECU 100 calculates the rotation number of the engine based on an output value from the crank angle sensor 15. The ECU 100 then calculates a load required for the engine based on the output value from the accelerator opening-degree sensor 16.

Furthermore, an upstream exhaust temperature sensor 17 and a downstream exhaust temperature sensor 18 are provided in the exhaust pipe 3 forward and rearward of the burner apparatus 8, respectively. The upstream exhaust temperature sensor 17 and the downstream exhaust temperature sensor 18 are connected to the ECU 100. The sensors are configured to detect the temperature of exhaust gas.

An oxygen concentration sensor 19 is provided in the exhaust pipe 3 upstream of the burner apparatus 8. The oxygen concentration sensor 19 is configured to detect the concentration of oxygen in exhaust gas from the oxygen concentration sensor 19. The oxygen concentration sensor 19 can be formed of, for example, a linear A/F sensor or an O2 sensor.

The intra-cylinder injection valve 5, the fuel addition valve 9, and the glow plug 10 are connected to and controlled by the ECU 100.

The burner apparatus 8 is used or actuated mainly during warm-up after cold start of the engine in order to activate the oxidation catalyst 6 and NOx catalyst 7 (particularly, the oxidation catalyst 6, located upstream of the NOx catalyst 7), which correspond to the main exhaust treatment apparatus. In addition to during warm-up, the burner apparatus 8 is used or actuated when the oxidation catalyst 6 and NOx catalyst 7 become colder and inactive.

When the burner apparatus 8 is actuated, the fuel addition valve 9 and the glow plug 10 are turned on to allow fuel injected or fed from the fuel addition valve 9 into the exhaust passage to mix with exhaust gas (particularly oxygen contained in the exhaust gas) to form an air-fuel mixture. The air-fuel mixture is combined with a heating effect exerted by the glow plug 10, to allow ignition and combustion. Thus, heating gas containing flame is generated. The heating gas mixes with surrounding exhaust gas, while sequentially heating the oxidation catalyst 6 and the NOx catalyst 7. Hence, the temperatures of the oxidation catalyst 6 and the NOx catalyst 7 increase.

Once the oxidation catalyst 6 is activated, CO and HC in the exhaust gas can be oxidized and combusted by the oxidation catalyst 6 so that the oxidation heat keeps the oxidation catalyst 6 at high temperature. Furthermore, hot gas can be discharged from the oxidation catalyst 6. Then, the NOx catalyst 7 can be activated by feeding the hot gas to the NOx catalyst 7. Once at least the oxidation catalyst 6 is activated, the burner apparatus 8 can be stopped.

While the burner apparatus 8 is in operation, the small-sized oxidation catalyst 11 is initially cold and inactive. However, the small-sized oxidation catalyst 11 is gradually heated by the surrounding exhaust gas and the heating gas containing flame. Thus, the temperature of the small-sized oxidation catalyst 11 increases to make the small-sized oxidation catalyst closer to the active state. The small-sized oxidation catalyst 11 has a small capacity. Gas flowing through the intra-catalyst passage 11A has a lower flow velocity than gas flowing around the small-sized oxidation catalyst 11. Hence, the small-sized oxidation catalyst 11 can be activated relatively early, and in particular, earlier than the oxidation catalyst 6.

Once the small-sized oxidation catalyst 11 is activated, CO and HC in the exhaust gas can be oxidized and combusted by the small-sized oxidation catalyst 11 as is the case with the oxidation catalyst 6. Furthermore, even an air-fuel mixture of the introduced added fuel F and oxygen can be oxidized and combusted by the small-sized oxidation catalyst 11. In particular, the oxidation heat of the oxidation of the air-fuel mixture rapidly increases the temperature of the small-sized oxidation catalyst 11 to a significantly large value. The small-sized oxidation catalyst 11 can combust the air-fuel mixture to generate flame. The resultant hot heating gas from the small-sized oxidation catalyst 11 can be utilized to further promote warm-up and activation of the oxidation catalyst 6.

Furthermore, the small-sized oxidation catalyst 11 also functions to reform the fuel component of the introduced air-fuel mixture. Specifically, carbon hydride in the fuel component which has a large carbon number is decomposed to generate carbon hydride which has a small carbon number and which is very reactive. Thus, the fuel component is reformed to offer high reactivity. The reformed fuel component can be oxidized more easily than the unreformed one by the oxidation catalyst 6, located downstream of the small-sized oxidation catalyst 11. This significantly serves to activate the oxidation catalyst 6 early.

Thus, while the engine is being warmed up after being started and both the small-sized oxidation catalyst 11 and the oxidation catalyst 6 are inactive, the small-sized oxidation catalyst 11, located on the upstream side, is preferably activated earlier than or in preference to the oxidation catalyst 6, located on the downstream side. In other words, preferably, heating gas is more positively supplied to the small-sized oxidation catalyst 11 than to the oxidation catalyst 6, and used to positively heat the small-sized oxidation catalyst 11.

On the other hand, after the small-sized oxidation catalyst 11 is activated, heating gas is preferably more positively supplied to the oxidation catalyst 6 than to the small-sized oxidation catalyst 11 to more positively heat the oxidation catalyst 6, thus promoting the warm-up of the oxidation catalyst 6.

In general, the position of an ignition point for the added fuel is not subjected to any control. Thus, even if heating gas is desirably positively supplied to the small-sized oxidation catalyst 11, the heating gas may be actually positively supplied to the oxidation catalyst 6 or vice versa. Hence, efficiently warming up the small-sized oxidation catalyst 11 and the oxidation catalyst 6 is difficult.

However, the present embodiment can control the position of the ignition point for the added fuel to efficiently warm up the small-sized oxidation catalyst 11 and the oxidation catalyst 6. This will be described below in detail.

In the present embodiment, the ECU 100 controls the amount of fuel added by the fuel addition valve 9 per predetermined unit time (hereinafter referred to as the amount of fuel added per unit time) to control the position of the ignition point where the added fuel F is ignited.

Figure 2:
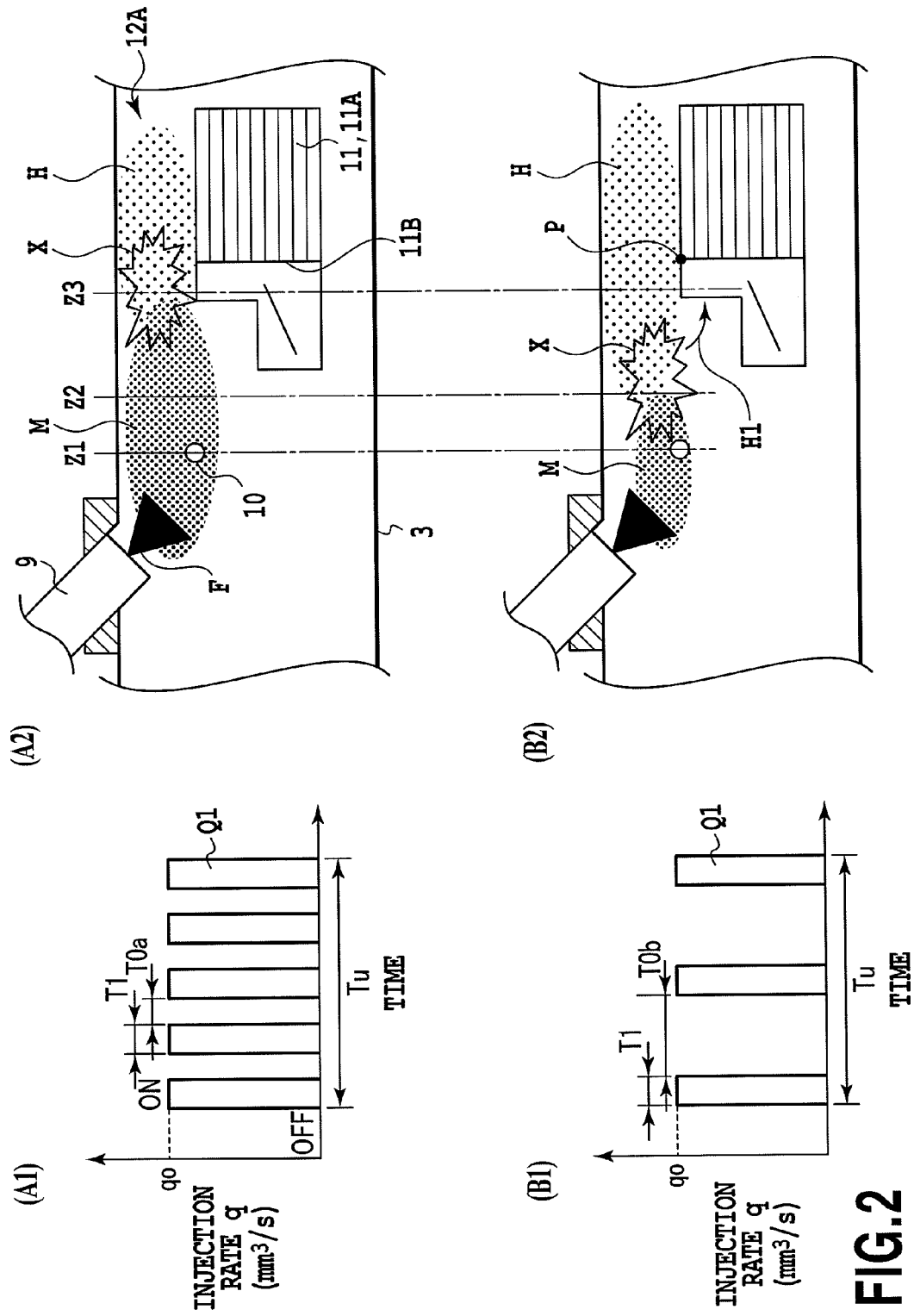
FIG. 2 is a diagram showing how a fuel addition valve in a burner apparatus is driven open and how added fuel is ignited.

In FIG. 2, how the fuel addition valve 9 is driven open is shown at (A1). How the added fuel is ignited in association with the operation of driving the fuel addition valve 9 open in (A1) is shown at (A2). Similar operations are shown at (B1) and (B2). However, (A1) and (A2) correspond to a great amount of fuel added per unit time. (B1) and (B2) correspond to a small amount of fuel added per unit time.

As shown in (A1) and (B1), the ECU 100 transmits periodic pulse signals to the fuel addition valve 9 to intermittently drive the fuel addition valve 7 open. This allows the fuel addition valve 9 to intermittently add the fuel. In other words, the ECU 100 alternately turns on and off the fuel addition valve 9 to repeatedly open and close the fuel addition valve 9, that is, to alternately carry out and stop the fuel addition.

In both (A1) and (B1), while the fuel addition valve 9 is open, a fuel injection rate q (mm$^3$/s) is constant at q0, and the time for which the fuel addition valve 9 is open is constant at T1 (s). An amount Q1=q0×T1 of fuel is added during one valve open step or per addition. Here, it should be noted that the fuel injection rate q is different from the amount of fuel added per unit time in value type, though the fuel injection rate q and the amount of fuel added per unit time are in the same units. The fuel injection rate q is a value varying depending on elements such as an injection pressure and an injection hole diameter.

However, if the amount of fuel added per unit time is great (A1), the time for which the addition is stopped, that is, the interval between additions, is shorter than if the amount of fuel added per unit time is small (B1). In (A1), the addition interval is constant at T0a, whereas in (B1), the addition interval is constant at T0b, which is longer than T0a.

For example, if the time from beginning to end of five additions illustrated in (A1) is set to be a unit time Tu, the amount of fuel added per unit time in (A1) is 5×Q1. In contrast, in (B1), only three additions are carried out during the same unit time Tu. Thus, the amount of fuel added per unit time is 3×Q1, which is smaller than in (A1).

For the control of the amount of fuel added per unit time, instead of or in addition to the method of controlling the addition interval within the unit time Tu, a method is possible which involves controlling the amount of fuel added during one addition within the unit time Tu. For example, the addition interval is set equal between a case with a great amount of fuel added per unit time and a case with a small amount of fuel added per unit time; the same number of additions are carried out in both cases. Moreover, the fuel injection rate in the former case is set greater than that in the latter case. Then, the amount of fuel added per unit time in the former case can be set greater than that in the latter case. Alternatively, the valve open time in the former case is set shorter than that in the latter case, and the addition interval in the former case is correspondingly set shorter than that in the latter case. Then, the amount of fuel added per unit time in the former case can be set greater than that in the latter case with the same number of additions maintained in both cases.

Now, the position of the ignition point in the case with a great amount of fuel added per unit time as shown in, for example, (A1) will be described. As shown in (A2), when the fuel is added, the added fuel F is washed away downstream while being diffused, by exhaust gas, thus forming a rich air-fuel mixture M with a low oxygen concentration in a relatively large area around the glow plug 10. The air-fuel mixture M is heated by the turned-on glow plug 10 but now lacks oxygen and cannot be immediately ignited. The air-fuel mixture M is washed away downstream while being gradually diffused, by the exhaust gas, thus increasing the oxygen concentration thereof, resulting in a lean air-fuel ratio. At the position where and the point of time when the air-fuel ratio is suitable for ignition, ignition occurs to generate an ignition point X as shown in FIG. 2. Once ignited, flame H is generated and washed away, by the exhaust gas, toward the oxidation catalyst 6, located on the downstream side.

The position of the glow plug 10 along the longitudinal direction of the exhaust pipe 3 or the direction in which exhaust gas flows is denoted by Z1. The position of the ignition point X is denoted by Z3. In particular, the ignition point X tends to be generated on an upper outer-peripheral passage 12A or an extension thereof. This is because most of the added fuel F and air-fuel mixture M advances on this passage. In the example illustrated in (A2), the ignition point position Z3 is located immediately forward of a front end inlet surface 11B of the small-sized oxidation catalyst 11.

On the other hand, the position of the ignition point in the case with a small amount of fuel added per unit time as shown in (B1) will be described. As shown in (B2), when the fuel is added, the added fuel F is washed away downstream while being diffused, by exhaust gas, thus forming a rich air-fuel mixture M with a low oxygen concentration in a relatively small area around the glow plug 10. The air-fuel mixture M is also heated by the turned-on glow plug 10 but now lacks oxygen and cannot be immediately ignited. The air-fuel mixture M is washed away downstream while being gradually diffused, by the exhaust gas, thus increasing the oxygen concentration thereof, resulting in a lean air-fuel ratio.

However, partly because of the originally small amount of fuel added per unit time, the air-fuel ratio of the air-fuel mixture M in this case reaches a value suitable for ignition relatively early. Hence, ignition occurs at a position Z2 located forward of the position Z3 in (A2) to generate an ignition point X as shown in FIG. 2. Subsequently, flame H is similarly generated and washed away, by the exhaust gas, toward the oxidation catalyst 6, located on the downstream side.

As is understood from the above description, the distribution of the air-fuel mixture concentration or oxygen concentration around the glow plug 10 is varied depending on the amount of fuel added per unit time.

The position Z2 of the ignition point X in (B2) is located forward or upstream of the ignition point position Z3 in (A2). The ignition point X tends to be generated on the upper outer-peripheral passage 12A or an extension thereof as described above. In the example illustrated in (B2), the ignition point position Z2 is located forward of and relatively away from the front end inlet surface 11B of the small-sized oxidation catalyst 11. In the example illustrated in (A2), the ignition point position Z3 is located forward of but relatively close to the front end inlet surface 11B of the small-sized oxidation catalyst 11.

As described above, the position of the ignition point along the exhaust flow direction can be controlled by controlling the amount of fuel added per unit time. For example, if heating gas is desirably positively supplied to the small-sized oxidation catalyst 11, the position of the ignition point X is controllably placed at the forward position Z2 as shown in (B2). This allows flame following the ignition point X to be positively guided to the small-sized oxidation catalyst 11 as shown by arrow H1. Thus, warm-up of the small-sized oxidation catalyst 11 can be promoted. In contrast, if heating gas is desirably supplied to the oxidation catalyst 6, located downstream of the small-sized oxidation catalyst 11, the position of the ignition point X is controllably shifted rearward as shown in (A2). This allows the flame H following the ignition point X to be positively guided to the oxidation catalyst 6, thus promoting warm-up of the oxidation catalyst 6.

The above-described control allows a change in the balance between the supply of heating gas or flame to the small-sized oxidation catalyst 11 and the supply of heating gas or flame to the oxidation catalyst 6. This enables the small-sized oxidation catalyst 11 and the oxidation catalyst 6 to be efficiently warmed up.

Figure 3:
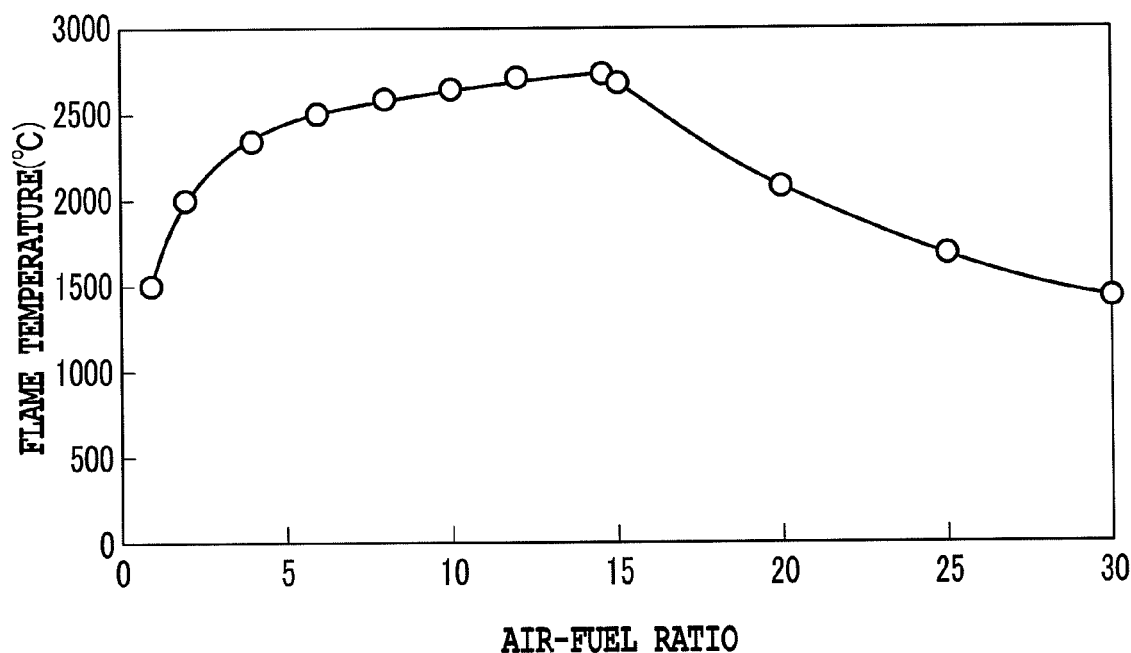
FIG. 3 is a graph illustrating the relationship between the air-fuel ratio of an air-fuel mixture and a flame temperature.

Now, the results of verification based on tests will be described. FIG. 3 illustrates the theoretical relationship between the air-fuel ratio of the air-fuel mixture (on the axis of abscissas) and the temperature of the flame resulting from combustion of the air-fuel ratio (on the axis of ordinate). In theory, the flame temperature decreases from the stoichiometry (theoretical air-fuel ratio; in the illustrated example, 14.5), that is, the peak value, with increasing air-fuel ratio (the air-fuel ratio varies toward the lean side). FIG. 3 illustrates such a relationship.

Figure 4:
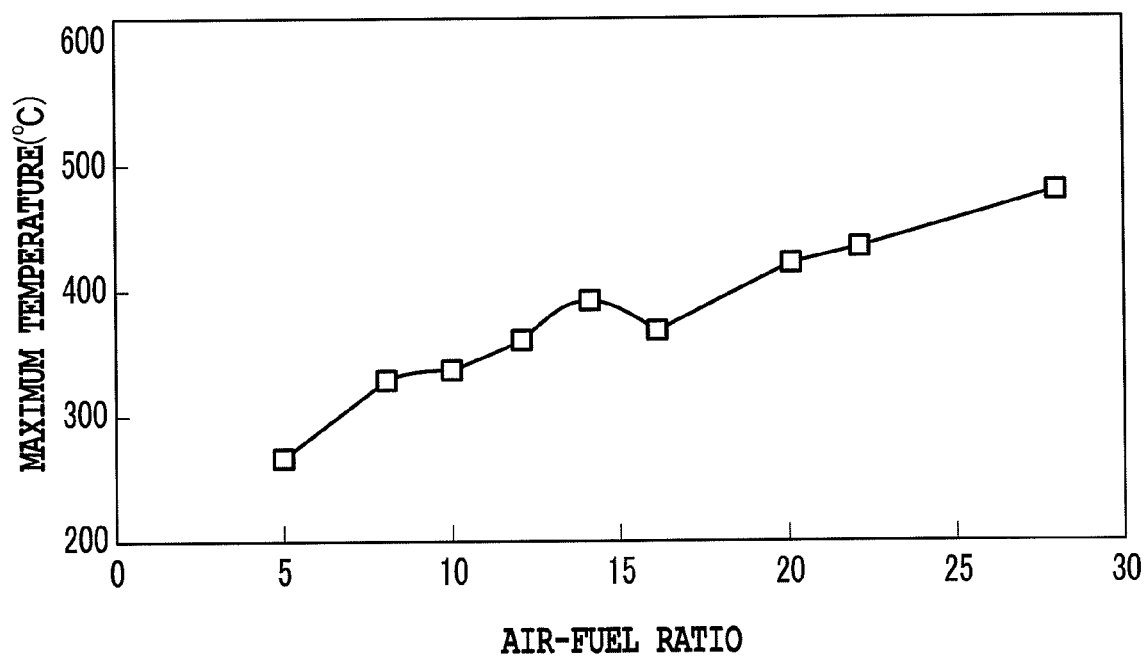
FIG. 4 is a graph illustrating the relationship between the air-fuel ratio of the air-fuel mixture and a maximum temperature measured at a temperature measurement point in the small-sized oxidation catalyst.

FIG. 4 illustrates the relationship between the air-fuel ratio of the air-fuel mixture at the position of the glow plug 10 obtained from the test results (on the axis of abscissas) and the maximum temperature measured at a temperature measurement position (shown by a point P in FIG. 2 (B2)) at the upper end of the front end surface of the small-sized oxidation catalyst 11. The results indicate that contrary to the theory, the maximum temperature at the temperature measurement position increases monotonously with the air-fuel ratio. Based on the results, it is appreciated that an increase in air-fuel ratio, that is, a decrease in the amount of fuel added per unit time, shifts the position of the ignition point X forward to more significantly heat the small-sized oxidation catalyst 11.

Figure 5:
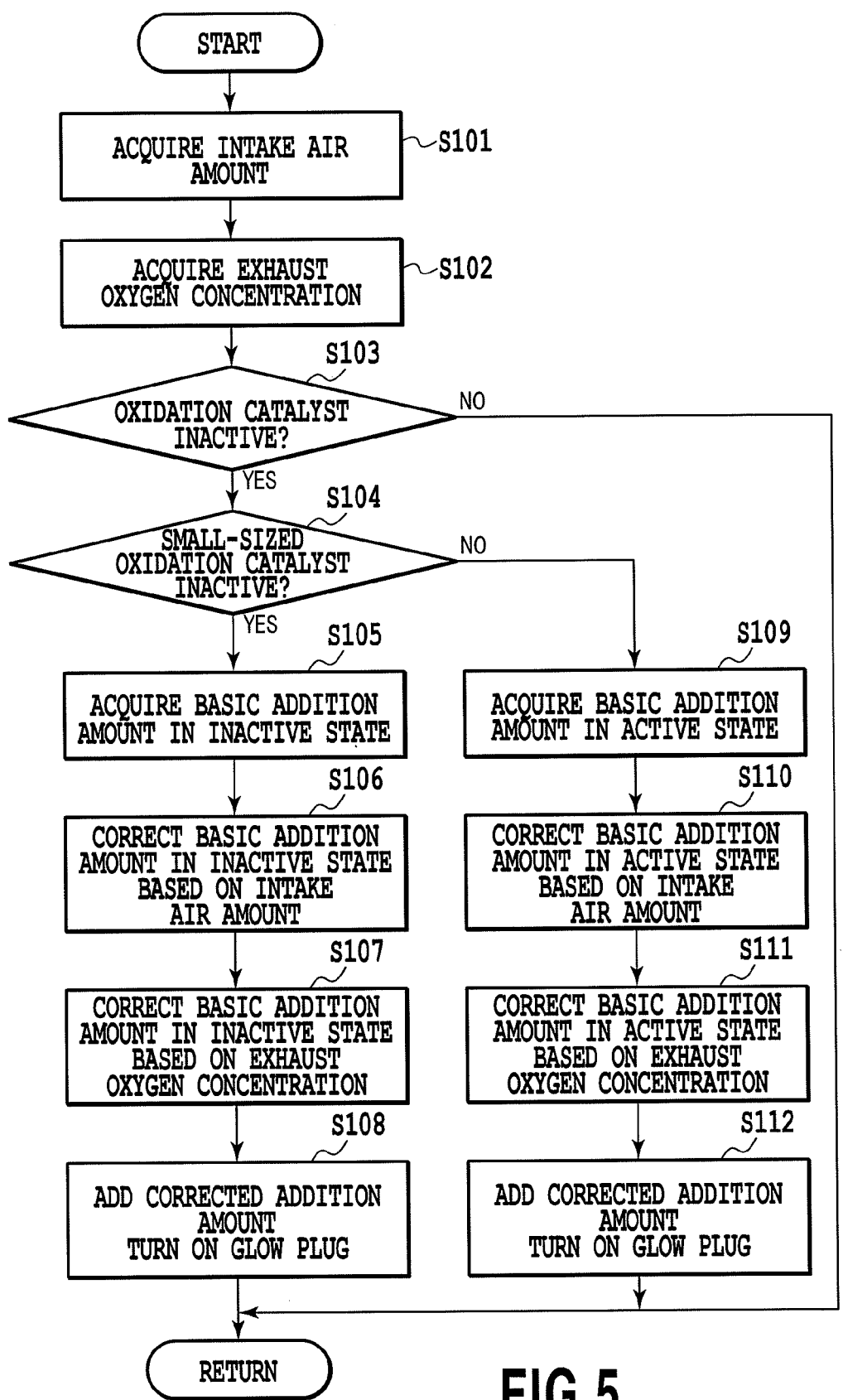
FIG. 5 is a flowchart illustrating a control routine for the burner apparatus.

Now, specific control according to the present embodiment will be described with reference to FIG. 5. An illustrated control routine is repeatedly executed at a predetermined arithmetic operation period by the ECU 100. For example, the arithmetic operation period can be set equal to the unit time Tu shown in FIG. 2. The unit time Tu may be, for example, 1 second.

In step S101, the ECU 100 obtains the value of an intake air amount Ga detected by the airflow meter 4. The value of the intake air amount Ga is used as a substitute value for the exhaust gas flow rate.

In step S102, the ECU 100 obtains the value of the oxygen concentration (exhaust oxygen concentration) C of exhaust gas detected by the oxygen concentration sensor 19.

In the present embodiment, the exhaust oxygen concentration is detected directly by the oxygen concentration sensor 19. However, the exhaust oxygen concentration may be estimated by the ECU 100. In this case, for example, the exhaust oxygen temperature is estimated based on the intake air amount Ga and the amount of fuel injected into the cylinder. Other estimation parameters may include an EGR valve opening degree, involved in execution of EGR, and a nozzle vane opening degree, involved in installation of a nozzle variable turbo charger.

In step S103, the ECU 100 determines the activity state of the oxidation catalyst 6. That is, the ECU 100 determines whether or not the oxidation catalyst 6 is inactive.

This determination is made based on the temperature of the oxidation catalyst 6. The temperature of the oxidation catalyst 6 may be detected directly by the temperature sensor but in the present embodiment, based on a detected value from the downstream exhaust temperature sensor 18 provided immediately forward of the oxidation catalyst 6. This estimation method is already known and will thus not be described below.

The oxidation catalyst 6 is determined to be active when the estimated temperature of the oxidation catalyst 6 is equal to or higher than a predetermined activity lower limit value. The oxidation catalyst 6 is determined to be inactive when the estimated temperature of the oxidation catalyst 6 is lower than the activity lower limit value.

If the oxidation catalyst 6 is determined to be active, the burner apparatus 8 need not be actuated. Then, the routine ends. On the other hand, if the oxidation catalyst 6 is determined to be inactive, the routine proceeds to step S104.

In step S104, the ECU 100 determines the activity state of the small-sized oxidation catalyst 11. That is, the ECU 100 determines whether or not the small-sized oxidation catalyst 11 is inactive.

This determination is also made based on the temperature of the small-sized oxidation catalyst 11. The temperature of the small-sized oxidation catalyst 11 may be detected directly by the temperature sensor but in the present embodiment, based on a detected value from at least one of the upstream exhaust temperature sensor 17 and downstream exhaust temperature sensor 18 provided forward and rearward, respectively, of the small-sized oxidation catalyst 11.

For example, the ECU 100 calculates the conversion efficiency J of the small-sized oxidation catalyst 11 during the current arithmetic operation period based on a predetermined map. The conversion efficiency J is predefined as a function of the exhaust temperature measured upstream of the small-sized oxidation catalyst 11 and the intake air amount Ga, a substitute value for the exhaust gas flow rate. The ECU 100 calculates the conversion efficiency J corresponding to the exhaust temperature detected by the upstream exhaust temperature sensor 17 and the intake air amount Ga acquired in step S101, based on the map.

Furthermore, the ECU 100 calculates the amount of fuel Qf added by the fuel addition valve 9 during one arithmetic operation period between the last arithmetic operation time and the current arithmetic operation time. The ECU 100 also estimates the amount of HC Qhc discharged from the engine during the one arithmetic operation period based on the engine operation state (for example, the engine rotation number and the accelerator opening degree) utilizing a predetermined map.

Then, based on Expression (1), the ECU 100 calculates a change ΔTc in the temperature of the small-sized oxidation catalyst 11 during the one arithmetic operation period. In the expression, Kh denotes a predetermined heating coefficient.

[Expression 1]

$$\Delta Tc = J \times (Qf + Qhc) \times Kh \quad (1)$$

The ECU 100 integrates the amount of temperature change ΔTc occurring during one arithmetic operation period, at every arithmetic operation time to estimate the temperature of the small-sized oxidation catalyst 11.

The method of estimating the temperature of the small-sized oxidation catalyst 11 is not limited to the one described above, and many estimation methods are possible. The temperature of the small-sized oxidation catalyst 11 may be estimated based on the difference in detected value between the upstream exhaust temperature sensor 17 and the downstream exhaust temperature sensor 18.

In step S104, if the estimated temperature of the small-sized oxidation catalyst 11 is lower than the predetermined activity lower limit value, the ECU 100 determines the small-sized oxidation catalyst 11 to be inactive. The routine then proceeds to step S105. On the other hand, if the estimated temperature of the small-sized oxidation catalyst 11 is equal to or higher than the activity lower limit value, the ECU 100 determines the small-sized oxidation catalyst 11 to be active. The routine then proceeds to step S109.

Upon determining the small-sized oxidation catalyst 11 to be inactive, the ECU 100 performs the following operation. First in step S105, the ECU 100 reads and acquires a basic value for the amount of fuel added per unit time in an inactive state (hereinafter referred to as a basic addition amount in the inactive state), from a predetermined storage area in the ECU 100. In particular, the basic addition amount in the inactive state is smaller than a basic value for the amount of fuel added per unit time in an active state (hereinafter referred to as a basic addition amount in the active state) described below.

Then, in step S106, the ECU 100 corrects the basic addition amount in the inactive state based on the value of the intake air amount Ga acquired in step S101. In this correction, the basic addition amount in the inactive state is corrected so as to increase consistently with the value of the intake air amount Ga.

The exhaust gas flow rate increases consistently with the intake air amount Ga, and the amount of fuel added per unit time needs to be increased in order to obtain the desired air-fuel ratio of the air-fuel mixture. Thus, such correction enables the desired air-fuel ratio of the air-fuel mixture to be constantly obtained regardless of the exhaust gas flow rate.

Then, in step S107, the ECU 100 further corrects the basic addition amount in the inactive state based on the value of the exhaust oxygen concentration C acquired in step S102. In this correction, the basic addition amount in the inactive state is corrected so as to increase consistently with the value of the exhaust oxygen concentration C.

The amount of fuel added per unit time needs to be increased in order to obtain the desired air-fuel ratio of the air-fuel mixture. Thus, such correction enables the desired air-fuel ratio of the air-fuel mixture to be constantly obtained regardless of the exhaust oxygen concentration.

Then, in step S108, the ECU 100 allows the fuel addition valve 9 to actually add an amount of fuel added per unit time which is equal to the basic addition amount in the inactive state corrected based on the intake air amount Ga and the exhaust oxygen concentration C (corrected addition amount). Then, the ECU 100 allows the glow plug 10 to be turned on to actuate the burner apparatus 8. Thereafter, the routine ends.

On the other hand, upon determining the small-sized oxidation catalyst 11 to be active in step S110, the ECU 100 performs the following operation. First in step 109, the ECU 100 reads and acquires the basic addition amount in the active state from the predetermined storage area in the ECU 100.

Then, in step S110, the ECU 100 also corrects the basic addition amount in the active state based on the value of the intake air amount Ga acquired in step S101. Also in this correction, the basic addition amount in the active state is corrected so as to increase consistently with the value of the intake air amount Ga.

Then, in step S111, the ECU 100 corrects the basic addition amount in the active state based on the value of the exhaust oxygen concentration C acquired in step S102. Also in this correction, the basic addition amount in the active state is corrected so as to increase consistently with the value of the exhaust oxygen concentration C.

Then, in step S112, the ECU 100 allows the fuel addition valve 9 to actually add an amount of fuel added per unit time which is equal to the corrected basic addition amount in the active state (corrected addition amount). Then, the ECU 100 allows the glow plug 10 to be turned on to actuate the burner apparatus 8. Thereafter, the routine ends.

The above-described control provides the following advantages and effects. First, according to the above-described control, when the small-sized oxidation catalyst 11 is determined to be inactive (Yes in step S104), the amount of fuel added per unit time is set smaller than when the small-sized oxidation catalyst 11 is active. This is because the basic addition amount in the inactive state is smaller than the basic addition amount in the active state. The subsequent correction based on the intake air amount Ga and the exhaust oxygen concentration C is at the same level for both the inactive and active states of the small-sized oxidation catalyst 11. This prevents the magnitude relationship between the value in the active state and the value in the inactive state from being affected. Thus, as shown in FIGS. 2 (B1) and 2 (B2), the ignition point X is controllably shifted to the position Z2, located forward of the small-sized oxidation catalyst 11 and closer to the glow plug 10.

Then, as shown by arrow H1 in FIG. 2 (B2), the flame generated at the ignition point X can be positively introduced directly into the small-sized oxidation catalyst 11 (particularly the front end surface 11B thereof). In other words, for the flame generated at the ignition point X, given the rate of flame H traveling toward the upper outer-peripheral passage 12A and the rate of flame H1 traveling toward the small-sized oxidation catalyst 11, the latter rate can be set greater than when the small-sized oxidation catalyst 11 is active. This promotes heating and warm-up of the small-sized oxidation catalyst 11, enabling the small-sized oxidation catalyst 11 to be activated earlier.

Even in this case, a certain rate of flame H traveling toward the upper outer-peripheral passage 12A is present. Thus, the heating effect exerted on the oxidation catalyst 6 by the flame H can be simultaneously ensured. However, at this time, the small-sized oxidation catalyst 11 is heated in preference to the oxidation catalyst 6.

In some cases, cells in the small-sized oxidation catalyst 11 is relatively fine. Then, even the flame H1 fed directly to the front end surface 11B may be extinguished at the position of the front end surface 11B and fail to pass through the cells (the inside of the catalyst). In such a case, temperature increase efficiency is lower than when the flame H1 can pass through the cells. However, after the extinction, very hot gas passes through the cells, enabling a sufficient temperature increase efficiency to be ensured.

Furthermore, at the forward position Z2 near the glow plug 10, ignition takes place to generate flame. Thus, the flame can heat the heat generation portion at the tip of the glow plug 10 to suppress a possible decease in the temperature of the glow plug 10. This in turn allows possible problems associated with the decrease in temperature to be avoided.

That is, when the fuel is fed from the fuel addition valve 9 toward the glow plug 10 as shown in FIG. 2 (B2), the heat in the heat generation portion of the glow plug 10 may be taken by the latent heat of vaporization the fuel, resulting in a decrease in the temperature of the heat generation portion. This reduces ignition efficiency and combustion stability. A voltage applied to the glow plug 10 may need to be increased in order to maintain the temperature of the heat generation portion. This increases fuel consumption.

However, the decrease in the temperature of the heart generation portion can be suppressed by generating flame at the forward position Z2 near the glow plug 10. Successful maintenance of the temperature of the heat generation portion allows the ignition efficiency and the combustion stability to be ensured. This eliminates the need to increase the applied voltage, thus allowing the fuel consumption to be prevented from increasing.

Moreover, since the forward position Z2 is close to the fuel addition valve 9, generating flame at the forward position Z2 is also effective for heating and increasing the temperatures of the fuel addition valve 9 (particularly a nozzle thereof) and nearby areas so that soot deposited in these areas can be combusted and removed by the flame. Thus, in particular, the nozzle of the fuel addition valve 9 can be prevented from being blocked with the soot.

In connection with the soot incineration effect, besides the warm-up control of the small-sized oxidation catalyst 11 and the oxidation catalyst 6 described with reference to FIG. 5 (that is, even after the warm-up), separate control intended for soot incineration may be periodically performed. That is, the burner apparatus 8 may be periodically controlled as follows: the fuel addition valve 9 is allowed to add a relatively small predetermined amount of fuel per unit time, and the glow plug 10 is turned on (heating means is actuated).

On the other hand, when the small-sized oxidation catalyst 11 is determined to be active (No in step S104), the amount of fuel added per unit time is set greater than when the small-sized oxidation catalyst 11 is inactive. This is because the basic addition amount in the active state is greater than that in the inactive state. Thus, as shown in FIGS. 2 (A1) and 2 (A2), the ignition point X is controllably shifted to the position Z3, located rearward of and away from the glow plug 10.

Then, as shown in FIG. 2 (A2), the flame H generated at the ignition point X can be positively directed to the upper outer-peripheral passage 12A and positively supplied to the oxidation catalyst 6. In other words, the rate of the flame H traveling toward the upper outer-peripheral passage 12A can be set greater than that of the flame H1 traveling toward the small-sized oxidation catalyst 1. This promotes heating and warm-up of the oxidation catalyst 6, enabling the oxidation catalyst 6 to be activated earlier. The oxidation catalyst 6 is heated in preference to the small-sized oxidation catalyst 11.

Furthermore, the rate of the flame H1 traveling toward the small-sized oxidation catalyst 11 can be reduced or such flame H1 can be almost eliminated. Thus, the above-described control is also effective for restraining an excessive increase in the temperature of the small-sized oxidation catalyst 11.

That is, when the small-sized oxidation catalyst 11 is active, the flame H1 no longer needs to be supplied to the small-sized oxidation catalyst 11. On the contrary, the supply of the flame H1 to the small-sized oxidation catalyst 11 may excessively increase the temperature of the front end surface 11B of the small-sized oxidation catalyst 11. The above-described control allows this problem to be avoided by significantly reducing the heating effect on the small-sized oxidation catalyst 11 after the small-sized oxidation catalyst 11 is activated.

Even when the small-sized oxidation catalyst 11 is inactive and the ignition point is controllably set at the forward position Z2, the flame H1 may come into direct contact with the front end surface 11B of the small-sized oxidation catalyst 11, thus excessively increasing the temperature of the front end surface 11B. Hence, the following control is possible. A temperature sensor is used to detect the temperature of the front end surface 11B of the small-sized oxidation catalyst 11 or a nearby area. When the detected temperature is equal to or higher than a predetermined value, the amount of fuel added per unit time is increased to shift the ignition point to the rearward position Z3. Thus, the front end surface 11B of the small-sized oxidation catalyst 11 can be prevented from increasing excessively.

According to the above-described control, when both the small-sized oxidation catalyst 11 and the oxidation catalyst 6 are inactive (Yes in both S103 and S104), the small-sized oxidation catalyst 11 can be heated in preference to the oxidation catalyst 6 by controllably placing the ignition point at the forward position Z2. Thus, the small-sized oxidation catalyst 11 can be activated earlier than the oxidation catalyst 6.

Furthermore, when the small-sized oxidation catalyst 11 is active and the oxidation catalyst 6 is inactive (Yes in S103 and No in S104), the oxidation catalyst 6 can be heated in preference to the small-sized oxidation catalyst 11 to promote the warm-up of the oxidation catalyst 6, by controllably placing the ignition point at the rearward position Z3. Hence, the small-sized oxidation catalyst 11 and the oxidation catalyst 6 can be sequentially and efficiently warmed up.

Many other embodiments of the present invention are possible. For example, the number, type, arrangement order, and the like of the exhaust treatment apparatuses arranged downstream of the small-sized oxidation catalyst are optional.

The present invention has been somewhat specifically described. It should be appreciated that various alterations and changes may be made without departing from the spirit and scope of the present invention. The embodiment of the present invention is not limited to the above-described aspects but include all variations and applications embraced by the concepts of the present invention specified by the claims. Thus, the present invention should not be interpreted in a limited manner but is also applicable to any other technique belonging to the scope of the concepts of the present invention. The means for solving the problems according to the present invention can be combined together wherever possible.

The invention claimed is:

1. An internal combustion engine characterized by comprising:
    an exhaust treatment apparatus provided in an exhaust passage;
    a burner apparatus provided upstream of the exhaust treatment apparatus to increase an exhaust temperature; and control means for controlling the burner apparatus, and in that the burner apparatus includes a fuel addition valve which adds fuel into the exhaust passage, heating means for heating the fuel added by the fuel addition valve, and a small-sized oxidation catalyst provided in the exhaust passage downstream of the heating means, and the control means controls an amount of fuel added by the fuel addition valve per predetermined unit time to control a position of an ignition point where the added fuel is ignited.

2. The internal combustion engine according to claim 1, characterized by further comprising determination means for determining an activity state of the small-sized oxidation catalyst.

3. The internal combustion engine according to claim 2, characterized in that when the determination means determines the small-sized oxidation catalyst to be inactive, the control means sets the amount of fuel added per unit time smaller than the amount of fuel added per unit time when the small-sized oxidation catalyst is active, thus controllably placing the position of the ignition point closer to the heating means.

4. The internal combustion engine according to claim 2, characterized in that when the determination means determines the small-sized oxidation catalyst to be active, the control means sets the amount of fuel added per unit time greater than the amount of fuel added per unit time when the small-sized oxidation catalyst is inactive, thus controllably placing the position of the ignition point further from the heating means.

5. The internal combustion engine according to claim 2, characterized in that the determination means also determines the activity state of the exhaust treatment apparatus, and when the determination means determines the small-sized oxidation catalyst and the exhaust treatment apparatus to be inactive, the control means sets the amount of fuel added per unit time smaller than the amount of fuel added per unit time when the small-sized oxidation catalyst is active, thus controllably placing the position of the ignition point closer to the heating means.

6. The internal combustion engine according to claim 5, characterized in that when the determination means determines the small-sized oxidation catalyst to be active and the exhaust treatment apparatus to be inactive, the control means sets the amount of fuel added per unit time greater than the amount of fuel added per unit time when the small-sized oxidation catalyst is inactive, thus controllably placing the position of the ignition point further from the heating means.

7. The internal combustion engine according to claim 1, characterized in that the control means increases the amount of fuel added per unit time consistently with a flow rate of exhaust gas.

8. The internal combustion engine according to claim 1, characterized in that the control means increases the amount of fuel added per unit time inconsistently with an oxygen concentration of exhaust gas.

9. The internal combustion engine according to claim 1, characterized in that the control means controllably places the position of the ignition point forward of a front end surface of the small-sized oxidation catalyst.

10. The internal combustion engine according to claim 1, characterized in that in order to combust and remove soot deposited on and near the fuel addition valve, the control means periodically allows the fuel addition valve to add fuel in such a manner that the amount of fuel added per unit time has a relatively small predetermined value and actuates the heating means.

11. The internal combustion engine according to claim 1, characterized in that the control means intermittently drives the fuel addition valve open to allow the fuel addition valve to intermittently add fuel and controls at least one of an amount of fuel added per addition and an addition interval to control the amount of fuel added per unit time.

* * * * *